United States Patent
Otsubo et al.

(10) Patent No.: US 10,150,489 B2
(45) Date of Patent: Dec. 11, 2018

(54) TUBULAR ELASTIC LINKAGE DEVICE FOR AXLE BEAM

(71) Applicants: Sumitomo Riko Company Limited, Aichi (JP); KAWASAKI JUKOGYO KABUSHIKI KAISHA, Kobe-shi, Hyogo (JP)

(72) Inventors: Shigehiro Otsubo, Aichi (JP); Yusuke Ito, Aichi (JP); Hideki Fukumoto, Hyogo (JP); Yoshinori Mitsuze, Hyogo (JP); Hiroyuki Fujii, Hyogo (JP); Jun Shirasaki, Hyogo (JP)

(73) Assignees: SUMITOMO RIKO COMPANY LIMITED, Aichi (JP); KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/689,287

(22) Filed: Aug. 29, 2017

(65) Prior Publication Data

US 2017/0355387 A1 Dec. 14, 2017

Related U.S. Application Data

(63) Continuation of application No. PCT/JP2016/074416, filed on Aug. 22, 2016.

(30) Foreign Application Priority Data

Aug. 24, 2015 (JP) ................................. 2015-165293

(51) Int. Cl.
*B61F 5/30* (2006.01)
*F16F 1/387* (2006.01)
(Continued)

(52) U.S. Cl.
CPC ................ *B61F 5/30* (2013.01); *F16F 1/387* (2013.01); *F16F 1/3828* (2013.01); *F16F 1/3873* (2013.01); *B61F 5/38* (2013.01)

(58) Field of Classification Search
CPC .. B61F 5/30; B61F 5/38; B61F 5/3828; F16F 1/387
See application file for complete search history.

(56) References Cited

U.S. PATENT DOCUMENTS

| | | | | |
|---|---|---|---|---|
| 2009/0189323 A1* | 7/2009 | Endo | ................... | F16F 13/1409 267/140.12 |
| 2010/0140856 A1* | 6/2010 | Endo | ....................... | F16F 13/14 267/140.12 |

(Continued)

FOREIGN PATENT DOCUMENTS

| | | |
|---|---|---|
| JP | 3747783 | 2/2006 |
| JP | 2014-020487 | 2/2014 |

OTHER PUBLICATIONS

Official Communication issued in European Patent Office (EPO) Patent Application No. 16839246.2, dated Apr. 12, 2018.

(Continued)

*Primary Examiner* — Vishal R Sahni
(74) *Attorney, Agent, or Firm* — Greenblum & Bernstein, P.L.C.

(57) ABSTRACT

A tubular elastic linkage device for axle beam for elastically linking a truck frame and an axle beam including: an inner axial member; two outer segments opposed in axis-perpendicular direction peripherally outside the inner axial member for attachment to a housing part on an axle-beam side; and a main rubber elastic body elastically connecting them. A pocket part opens in an outer peripheral face of the main rubber elastic body onto outside via a window penetrating one outer segment. A stopper supported by the inner axial member is disposed in the pocket part to face the housing (Continued)

part distantly via the window. Contact of the stopper with the housing part constitutes a displacement limitation mechanism between the inner axial member and the outer segments. The other outer segment has an aperture having the main rubber elastic body exposed outside via it.

8 Claims, 7 Drawing Sheets

(51) Int. Cl.
 *F16F 1/38* (2006.01)
 *B61F 5/38* (2006.01)

(56) References Cited

U.S. PATENT DOCUMENTS

| | | | |
|---|---|---|---|
| 2010/0213651 A1* | 8/2010 | Hori .................. | F16F 13/14 |
| | | | 267/140.13 |
| 2014/0210148 A1* | 7/2014 | Eguchi ................ | F16F 1/3828 |
| | | | 267/141 |
| 2016/0053848 A1* | 2/2016 | Nakamura ............ | F16F 1/3842 |
| | | | 248/634 |

OTHER PUBLICATIONS

International Preliminary Report on Patentability for PCT/JP2016/074416, dated Mar. 8, 2018, with English language translation.
Office Action issued in China Counterpart Patent Appl. No. 201680004353.6, dated Jul. 4, 2018, along with an English translation thereof.

\* cited by examiner

TUBULAR ELASTIC LINKAGE DEVICE FOR AXLE BEAM

INCORPORATED BY REFERENCE

The disclosure of Japanese Patent Application No. 2015-165293 filed on Aug. 24, 2015 including the specification, drawings and abstract is incorporated herein by reference in its entirety. This is a Continuation of International Application No. PCT/JP2016/074416 filed on Aug. 22, 2016.

BACKGROUND OF THE INVENTION

1. Field of the Invention

The present invention relates to a tubular elastic linkage device for axle beam that elastically links an end of an axle beam to a truck frame of a railway vehicle.

2. Description of the Related Art

From the past, railway vehicles generally employ a structure wherein an axle beam extends out in the vehicle longitudinal direction from an axle box part that supports an axle, and an end of the axle beam is elastically linked to a truck frame by a tubular elastic linkage device. As Japanese Unexamined Patent Publication No. JP-A-2014-020487 and the like disclose, this tubular elastic linkage device for axle beam comprises an inner axial member, a pair of outer segments disposed about radially outward of the inner axial member so as to extend in the circumferential direction, and a main rubber elastic body elastically connecting the inner axial member and the pair of outer segments to one another. Both axial ends of the inner axial member are fixed to the truck frame, while the outer segments are attached to a tubular housing part provided at an end of the axle beam. By so doing, the axle beam is elastically supported by the truck frame via the tubular elastic linkage device for axle beam.

The tubular elastic linkage device for axle beam may be provided with a stopper, in order to limit relative displacement between the inner axial member and the pair of outer segments in a specified radial direction in which a large load input is expected. Specifically, since a large load during deceleration is input upon the tubular elastic linkage device for axle beam in the radial direction corresponding to the vehicle longitudinal direction, in JP-A-2014-020487, the stopper is provided protruding from the inner axial member toward either of the outer segments in the radial direction. The inner axial member and the outer segment come into contact via the stopper, thereby limiting the relative displacement between the inner axial member and the outer segments in the specified radial direction. This arrangement provides improvement of durability of the main rubber elastic body, the target braking performance of the railway vehicle, and the like.

According to JP-A-2014-020487, the stopper is disposed radially between the face of the inner axial member and the face of the corresponding outer segment that face each other, and the main rubber elastic body is provided continuously between the stopper and the outer segment. With this structure, unfortunately, not only in a large load input, but also for normal vibration between the truck and the axle that is input during drive etc., the main rubber elastic body is compressed in a narrow part between the faces of the stopper and the outer segment in the radial direction where the stopper is disposed. As a result, the spring characteristics of the device get harder and adversely affect suspension performance of the truck. Moreover, in the structure of JP-A-2014-020487, the main rubber elastic body provides linkage between the stopper and the outer segment. Therefore, when a load in the circumferential direction is input between the inner axial member and the outer segment of the tubular elastic linkage device, the main rubber elastic body is compressed by the stopper, thereby exerting hard spring. This hard spring is likely to affect suspension characteristics of the truck.

In Japanese Patent No. JP-B-3747783, there is proposed a structure wherein a gap is provided between the stopper and the housing part such that the stopper supported by the inner axial member touches the housing part only during a large load input. In JP-B-3747783, the pair of outer segments are disposed to face each other in the vertical direction. The stopper is disposed between the circumferential ends of the upper and lower outer segments, whereby the protruding tip of the stopper and the outer segments are not radially linked by the main rubber elastic body, while a prescribed gap is formed on the side of the protruding tip of the stopper.

Unfortunately, for the above-referenced structure wherein the gap is formed radially between the stopper and the housing part, the rubber volume of the main rubber elastic body is small in the radial direction where the stopper is disposed. Therefore, in the radial direction, the spring constant is likely to be smaller than in another radial direction, so that the degree of freedom in tuning the characteristics may become small in the normal vibration input state like the time of driving.

Since the outer segments are disposed to face each other in the vertical direction, if they are attached to the housing part of division structure in the vehicle longitudinal direction as shown in FIG. 13 of JP-B-3747783, outer peripheral faces of the outer segments may be damaged by galling by the division edges of the housing part, or the like. If the special structure as shown in JP-B-3747783 is not used, it is required to perform attachment works of the device to the axle beam carefully.

SUMMARY OF THE INVENTION

The present invention has been developed in view of the above-described matters as the background, and it is an object of the present invention to provide a tubular elastic linkage device for axle beam with a novel structure so that the spring ratio of radial directions is able to set with a great degree of freedom, and excellent elastic linkage performance can be obtained, even though a stopper is provided in a specified radial direction.

The above and/or optional objects of this invention may be attained according to at least one of the following modes of the invention. The following modes and/or elements employed in each mode of the invention may be adopted at any possible optional combinations.

Specifically, a first mode of the present invention provides a tubular elastic linkage device for axle beam for elastically linking a truck frame and an axle beam of a railway vehicle comprising: an inner axial member configured to be fixed to the truck frame of the railway vehicle; a pair of outer segments disposed about an outer periphery of the inner axial member so as to face each other in an axis-perpendicular direction, the pair of outer segments being configured to be attached to a tubular housing part provided at an end of the axle beam; and a main rubber elastic body elastically connecting the inner axial member and the pair of outer segments with one another, wherein a pocket part is formed in one side of the main rubber elastic body so as to open in an outer peripheral face thereof, while a window is formed through a first one of the outer segments such that the pocket part opens onto an outside via the window, a stopper supported by the inner axial member is disposed in the pocket part so that the stopper faces the housing part with a distance in between in an axis-perpendicular direction via the window, while the stopper is configured to be abutted against the housing part so as to constitute a displacement limitation mechanism limiting relative displacement between the inner axial member and the pair of outer segments, and an aperture is formed in a second one of the outer segments so that an other side of the main rubber elastic body deviate from the pocket part is exposed to the outside via the aperture.

According to this tubular elastic linkage device for axle beam constructed following the first mode, on the assumption that a large load is input by a single-push type wheel tread brake or the like, the stopper is provided only in one radial direction. In the first outer segment, the window through which the stopper is exposed is formed, while, in the second outer segment, the aperture is formed. This avoids the spring from becoming small only on the one side of the diametrical direction where the stopper is provided. As a result, the springs of the main rubber elastic body interposed between the inner axial member and the respective outer segments on both sides of the diametrical direction become close to each other. Therefore, in normal driving state etc. of the railway vehicle where the stopper does not touch the housing part, it is easy to tune the spring ratio between the stopper protrusion side and the opposite side. This makes it possible to get excellent characteristics in relation to vibration input on the both sides of the diametrical direction in which the outer segments face each other.

The pair of outer segments face each other in the stopper protrusion direction. Both on the stopper protrusion side and its opposite side to which the load is input, the compression spring of the main rubber elastic body dominates, whereby the durability can be improved. Additionally, comparatively hard spring characteristics by the compression spring are obtained, so that it is possible to tune the spring characteristics with a great degree of freedom, by forming the window and the aperture in the outer segments.

Moreover, since the window is formed through a part of the first outer segment, in the axial outsides of the window, relative to an input in the stopper protrusion direction, the compression spring of the main rubber elastic body is efficiently exhibited radially between the inner axial member and the outer segment. Thus, decrease of the spring by formation of the window, which has the stopper exposed, is not likely to become a problem, and it is possible to secure a large degree of freedom in tuning the spring.

If a gap is provided between the stopper and the inner faces of the pocket part, for example, when a load in the peripheral direction is input between the inner axial member and the outer segment, compression of the main rubber elastic body due to the stopper is avoided. Thus, it is easy to set the spring small, so that it may be possible to tune the characteristics such as truck suspension performance and elasticity with a greater degree of freedom.

A second mode of the present invention provides the tubular elastic linkage device for axle beam according to the first mode, wherein the aperture is formed at an end in a peripheral direction of the second one of the outer segments.

According to the second mode, it is remarkably easy to form the aperture. Besides, for the middle portion in the peripheral direction of the outer segment, the compression spring and the tensile spring of the main rubber elastic body can be efficiently gotten. Furthermore, it is easier to provide the middle portion in the peripheral direction with a positioning structure between the housing part and the outer segment.

A third mode of the present invention provides the tubular elastic linkage device for axle beam according to the second mode, wherein an opening area of the aperture is larger than an opening area of the window.

According to the third mode, the aperture is formed at the end in the peripheral direction of the second outer segment. Consequently, the compression spring component of the main rubber elastic body is more dominant radially between the inner axial member and the second outer segment, than radially between the inner axial member and the first outer segment including the window formed at its middle portion in the peripheral direction. As a result, by opening the aperture more largely than the window so that the bonded area on the main rubber elastic body of the second outer segment becomes smaller than that of the first outer segment, it becomes easier to set the springs mutually close on the side of stopper disposition relative to the inner axial member and on its opposite side.

A fourth mode of the present invention provides the tubular elastic linkage device for axle beam according to the first mode, wherein the aperture is formed at a middle portion in a peripheral direction of the second one of the outer segments.

According to the fourth mode, since the aperture is formed at the middle portion in the peripheral direction of the corresponding outer segment, as well as the window, it is possible to more readily set the springs mutually close on the stopper disposition side and on its opposite side. It is because each formation position for the window and the aperture is the middle portion in the peripheral direction of the corresponding outer segment, so that an effect by the formation of the window on the spring and an effect by the formation of the aperture on the spring become mutually close on the both sides of the diametrical direction where the pair of outer segments face each other.

A fifth mode of the present invention provides the tubular elastic linkage device for axle beam according to the fourth mode, wherein the aperture is formed with the same opening shape and the same opening area as those of the window, while the aperture is positioned as opposed to the window in an axis-perpendicular direction.

According to the fifth mode, the aperture and the window are disposed as opposite to each other in the axis-perpendicular direction. As a result, the effect by the formation of the window on the spring on the stopper disposition side and the effect by the formation of the aperture on the spring on the opposite side to the stopper disposition side become even closer. Thus, it is possible to tune the spring on the stopper disposition side and the spring on the opposite side more easily.

Furthermore, not only disposition for the aperture and the window, but also the opening shape and the opening area thereof are made equal. This makes it possible to easily set roughly the same springs for both the stopper disposition side and its opposite side.

A sixth mode of the present invention provides the tubular elastic linkage device for axle beam according to the fourth or fifth mode, wherein a lightening recess is formed in the main rubber elastic body so as to open in the outer peripheral face thereof, while the lightening recess opens onto the outside via the aperture.

According to the sixth mode, the lightening recess, which opens onto the outside via the aperture, is formed in the main rubber elastic body. Thus, in the main rubber elastic body, the side wherein the lightening recess is formed and the side wherein the pocket part is formed have mutually corresponding structures. This makes it easy to set the springs of the main rubber elastic body to be more mutually closer on the stopper disposition side and on its opposite side.

A seventh mode of the present invention provides the tubular elastic linkage device for axle beam according to any one of the first to sixth modes, wherein the pair of outer segments are configured to be attached to a pair of front and back semi-tubular members constituting the housing part by superposing the pair of front and back semi-tubular members of the housing part to the pair of outer segments from opposite outsides.

According to the seventh mode, the housing part has a division structure wherein the pair of semi-tubular members divided in the peripheral direction are combined. Therefore, the pair of outer segments can be readily attached to the housing part, so that the mounting work of the tubular elastic linkage device for axle beam on the axle beam is facilitated. When the tubular elastic linkage device for axle beam is attached to the housing part, the pair of semi-tubular members are superposed to the pair of outer segments from the outsides in the direction where the outer segments face each other. This makes it easier to prevent peripheral contact of the peripheral ends of the semi-tubular members against the outer peripheral face of the outer segments, thereby avoiding damages due to galling.

An eighth mode of the present invention provides the tubular elastic linkage device for axle beam according to any one of the first to seventh modes, further comprising a positioner configured to position at least one of the pair of outer segments and the housing part relative to each other in a peripheral direction.

According to the eighth mode, it is possible to attach the tubular elastic linkage device for axle beam to the housing part while orienting the device to a prescribed side. Particularly, relative to an input direction of a large load for which a displacement regulating action owing to the stopper is required, it is possible to set the stopper disposition side with easiness and good accuracy. Thus, it is possible to obtain the target elastic linkage performance, high durability owing to displacement control, and the like.

According to the present invention, in one of the outer segments, the window is formed, while, in the other, the aperture is formed. As a result, the springs of the main rubber elastic body interposed between the inner axial member and the respective outer segments become closer to each other. This makes it easy to relatively tune the springs between the side of the stopper protrusion from the inner axial member, and the opposite side thereto. Moreover, since the pair of outer segments are opposed to each other in the stopper protrusion direction, in relation to input of compression force and tensile force in the stopper protrusion direction, the compression spring and the tensile spring of the main rubber elastic body dominate, whereby the durability can be improved. Additionally, the window and the aperture are formed in the outer segments, so that the spring can be tuned with a great degree of freedom. Furthermore, the window is formed partially piercing one of the outer segments. By so doing, the compression spring and the tensile spring of the main rubber elastic body are efficiently gotten in the axial outsides of the window, so that the spring lowering due to the formation of the window is not likely to become a problem.

BRIEF DESCRIPTION OF THE DRAWINGS

The foregoing and/or other objects, features and advantages of the invention will become more apparent from the following description of embodiments with reference to the accompanying drawings in which like reference numerals designate like elements and wherein.

DETAILED DESCRIPTION OF EMBODIMENTS

Embodiments of the present invention will be described hereinafter in reference to the drawings.

Figure 1:
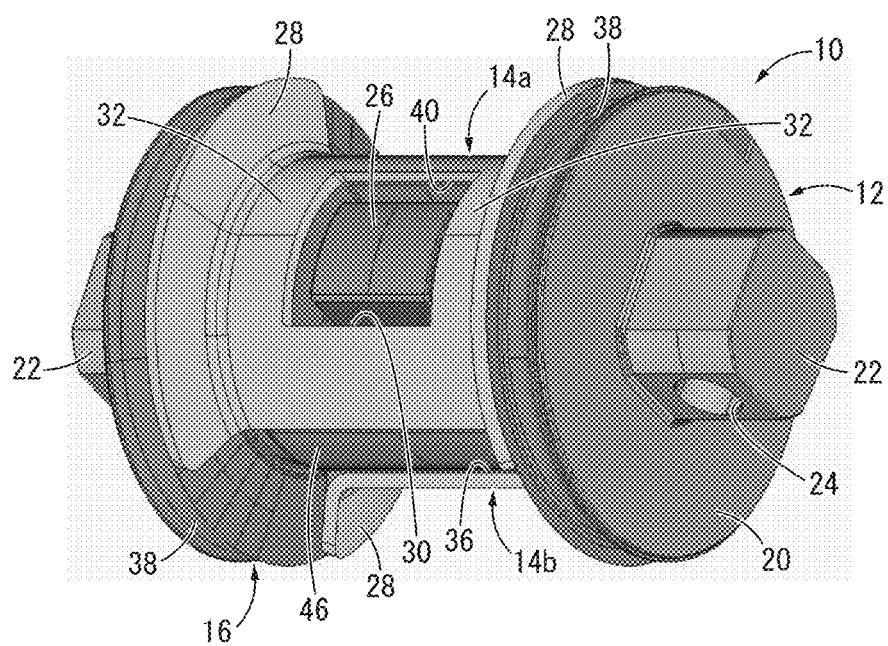
FIG. 1 is a perspective view showing a tubular elastic linkage device for axle beam in the form of a rubber bushing for axle beam as a first embodiment of the present invention.
Figure 2:
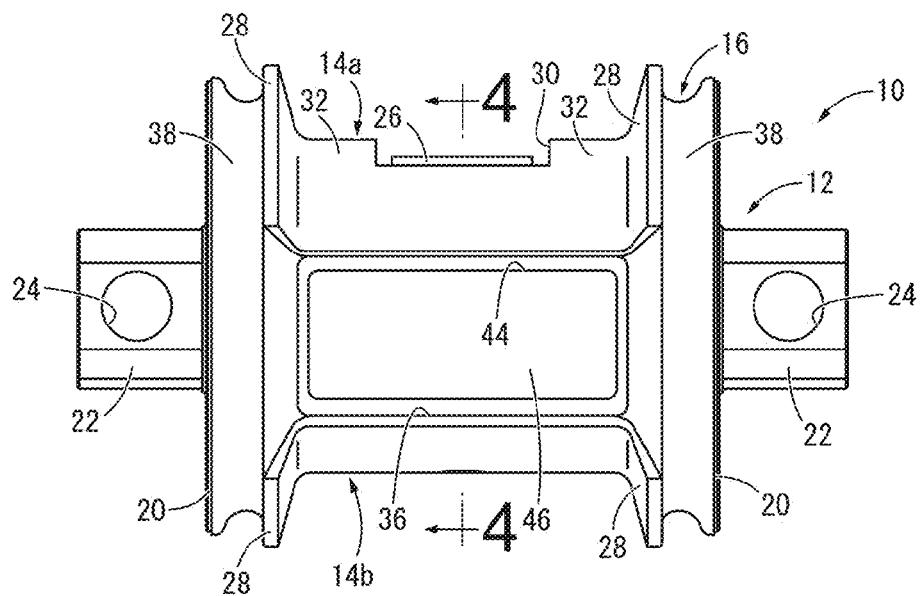
FIG. 2 is a top plan view of the rubber bushing for axle beam shown in FIG. 1.
Figure 3:
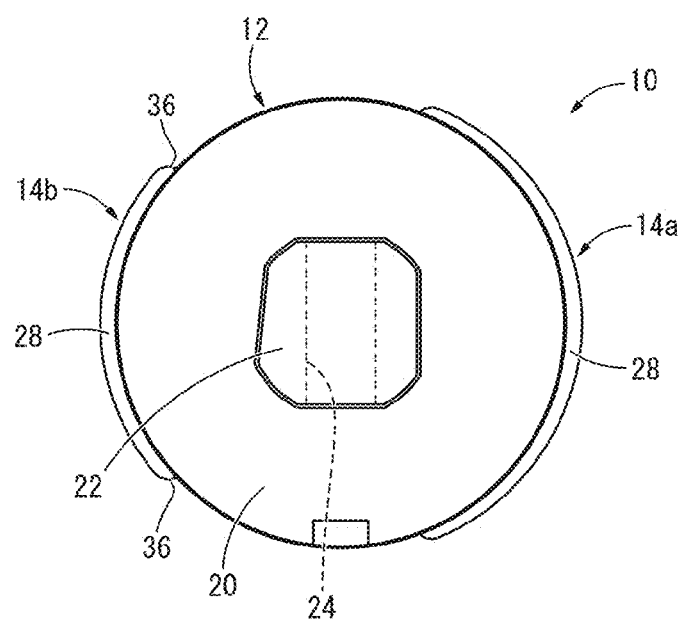
FIG. 3 is a right side view of the rubber bushing for axle beam shown in FIG. 1.
Figure 4:
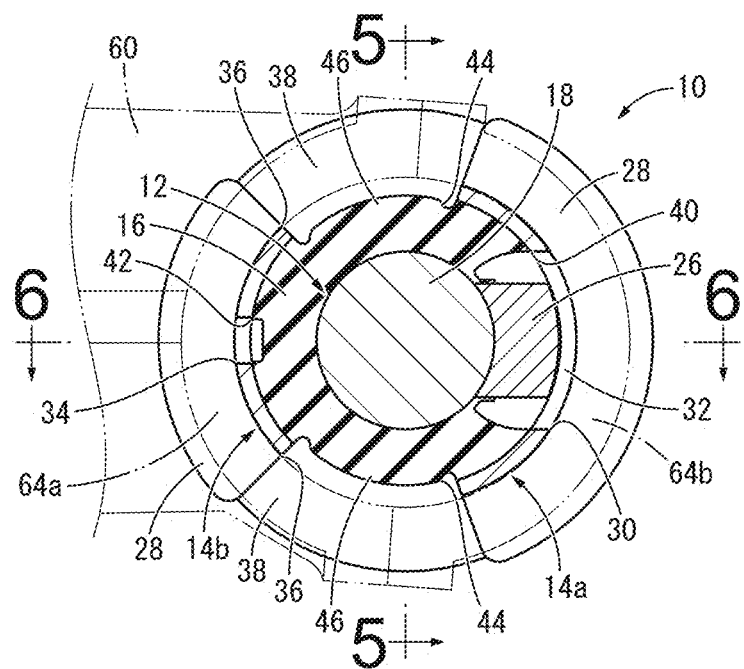
FIG. 4 is a cross sectional view taken along line 4-4 of FIG. 2.
Figure 5:
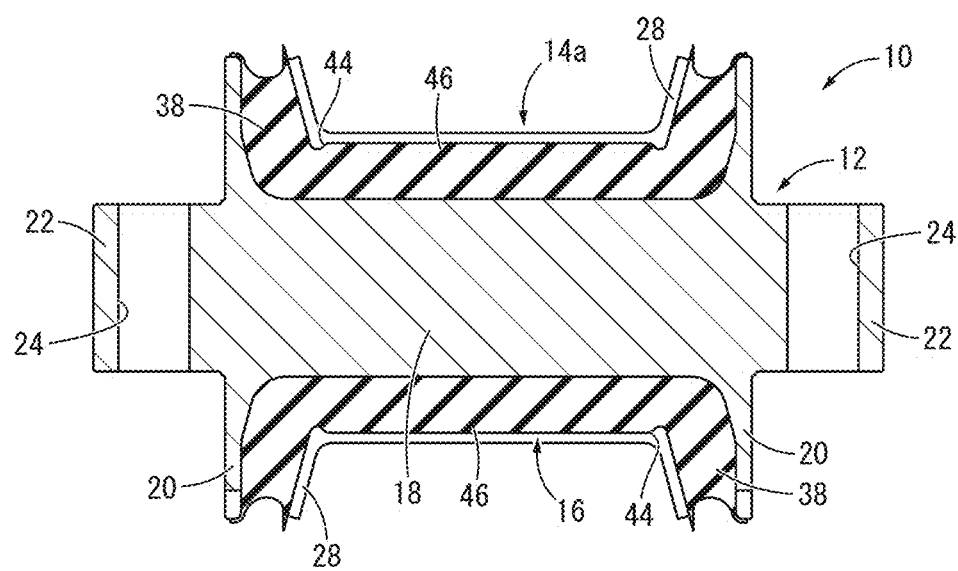
FIG. 5 is a cross sectional view taken along line 5-5 of FIG. 4.
Figure 6:
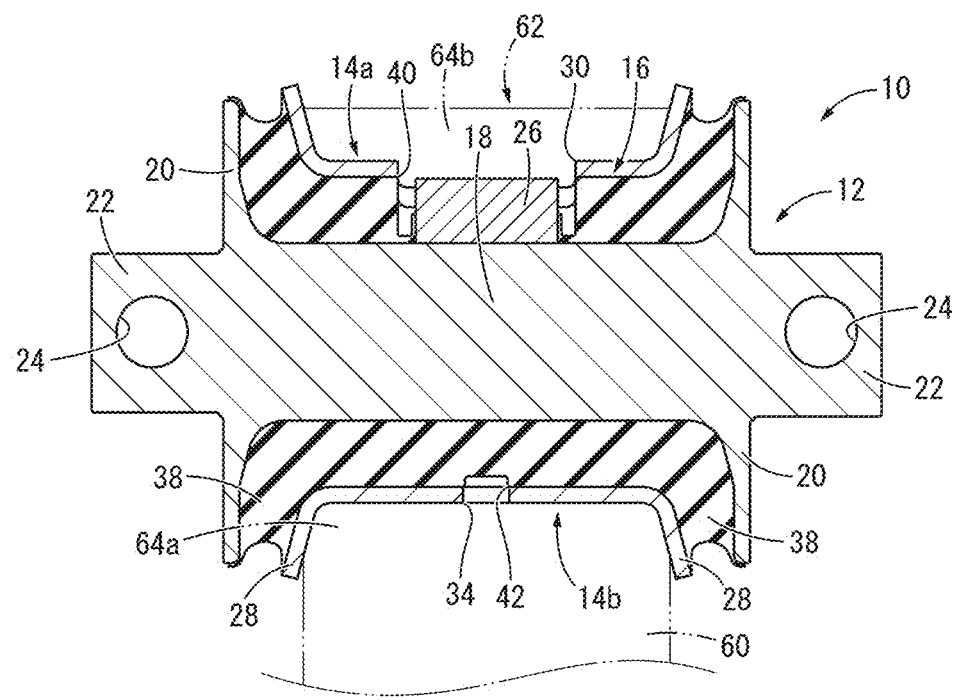
FIG. 6 is a cross sectional view taken along line 6-6 of FIG. 4.

FIGS. 1 to 3 show a rubber bushing for axle beam 10 used in a railway vehicle as a first embodiment of a tubular elastic linkage device for axle beam structured according to this invention. As FIGS. 4 to 6 show, the rubber bushing for axle beam 10 comprises an inner axial member 12, front and back outer segments 14a, 14b that are disposed about an outer periphery of the inner axial member 12 to face each other, and a main rubber elastic body 16 elastically connecting them with one another. In explanation hereinafter, unless otherwise stated, the vertical direction means the vertical direction in FIG. 3 and about the vertical direction when the rubber bushing for axle beam 10 is mounted on the railway vehicle. As well, the longitudinal direction means the lateral direction in FIG. 3 and roughly the vehicle longitudinal direction when it is mounted on the railway vehicle. The lateral direction means the lateral direction in FIG. 2 and substantially the vehicle lateral direction in the mounted state on the railway vehicle.

More specifically, the inner axial member 12 is a high rigidity member formed of iron, an aluminum alloy, or the like. As FIGS. 4 to 6 show, the inner axial member 12 includes a central axis main unit 18 having a solid cylindrical rod shape. With each end of the central axis main unit 18, an inner collar part 20 of flange shape expanding radially outward and a fixation part 22 protruding further to the axial outside than the inner collar part 20 are integrally formed. Each fixation part 22 of the present embodiment has a shape of about polygonal prism as FIGS. 1 to 3 show, and a bolt hole 24 is formed through it so as to extend in the vertical direction of the axis-perpendicular direction. For the inner collar part 20, the axially outer face expands in generally the axis-perpendicular direction, while the radially inner part of the axially inner face is a tapered face. That is, the radially inner part of the inner collar part 20 becomes gradually thinner as it goes to radially outside, while the radially outer part thereof expands with a nearly constant thickness. The shape of the inner axial member 12 is not interpreted in a limited way by the specific descriptions of the embodiment. That is, the specific shape or the like for all the constituent parts of the inner axial member 12 (the central axis main unit 18, the inner collar parts 20, the fixation parts 22, and the bolt holes 24 in this embodiment) is not particularly limited.

To the central axis main unit 18 of the inner axial member 12, a stopper 26 is attached. As FIGS. 4 and 6 show, the stopper 26 has a block shape wherein each of the radially inner face and the radially outer face is constituted by a curved face that is curved in the circumferential direction. The stopper 26 is a high rigidity member formed of a metal, a rigid synthetic resin, or the like. The stopper 26 is superposed on the radially outer face of the central axis main unit 18 of the inner axial member 12, and fixed to the axially central part thereof by such a means as welding, bonding, or bolt connection. Note that the stopper 26 is not always required to be fixed to the inner axial member 12 in advance. For example, it is also possible that the stopper 26 is set in a mold separately from the inner axial member 12 during vulcanization molding of the main rubber elastic body 16, and it is securely positioned to the inner axial member 12 by the main rubber elastic body 16.

Each of the outer segments 14a, 14b has a curved plate shape extending in the circumferential direction by a length shorter than a half circumference, wherein an outer collar part 28 that is folded to the radial outside is integrally formed with each axial end thereof. The outer collar part 28 slants to the axial outside as it goes to the radial outside so that it faces the radially inner part of the inner collar part 20 on a slant.

With one outer segment 14a, a window 30 is formed through its central part in the circumferential direction and in the axial direction with about rectangular cross section. The window 30 is formed with an axial dimension that fails to reach the outer collar parts 28. At a part between the window 30 and the base end of each outer collar part 28 in the axial direction, a bonded part 32 is provided extending in the circumferential direction.

Figure 7:
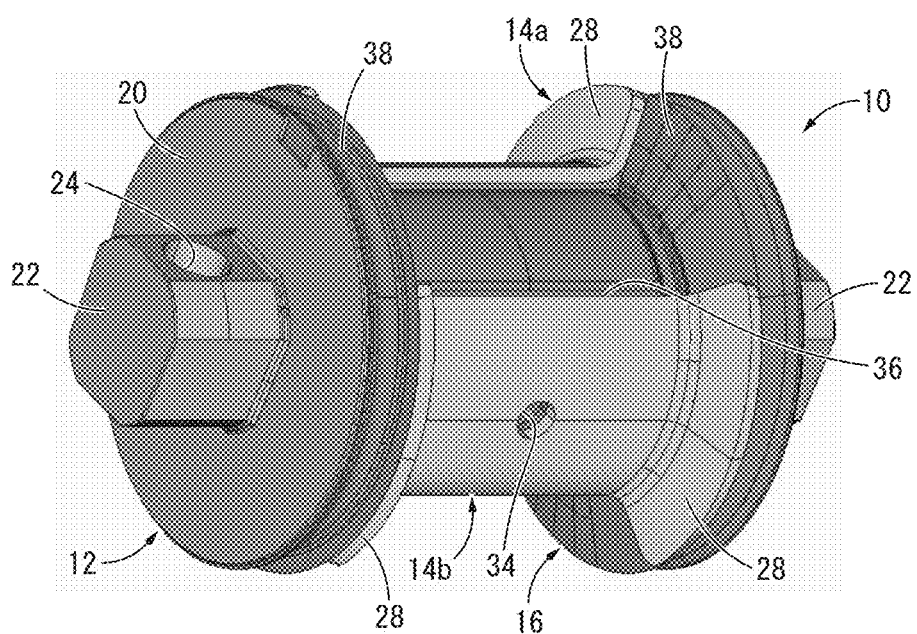
FIG. 7 is a perspective view showing the rubber bushing for axle beam of FIG. 1 at another angle.

With the other outer segment 14b, as FIG. 7 shows, a positioning hole 34 is formed through its central part with a small-diameter circular cross section. Although the positioning hole 34 of this embodiment is formed with an opening area smaller enough than that of the window 30, the cross sectional shape and the size of the positioning hole 34 are not especially limited.

Additionally, apertures 36 are formed at both ends in the peripheral direction of the other outer segment 14b. The apertures 36 of the present embodiment are formed across the entirety of the outer segment 14b including the outer collar parts 28 in the axial direction. The apertures 36 are formed at the both circumferential ends of the outer segment 14b, whereby the circumferential length of the outer segment 14b is shorter than that of the outer segment 14a. In this embodiment, the sum of the opening areas of the apertures 36, 36 is larger than the opening area of the window 30. Note that the opening areas of the apertures 36, 36 are changed as appropriate depending on the required spring characteristics in the longitudinal direction etc. and the sum of the opening areas of the apertures 36, 36 may be smaller than the opening area of the window 30.

The outer segments 14a, 14b are disposed to be separated from the central axis main unit 18 of the inner axial member 12 to the radial outside. The inner axial member 12 and the outer segments 14a, 14b are elastically connected to one another by the main rubber elastic body 16. The outer segment 14a and the outer segment 14b are disposed to face each other in the diametrical direction across the central axis main unit 18, while the circumferential ends of the outer segment 14a and the outer segment 14b are spaced away from one another in the circumferential direction.

The main rubber elastic body 16 has a nearly cylindrical shape with a thick wall as a whole. With each axial end of the main rubber elastic body 16, a rubber collar part 38 projecting radially outward is integrally formed. For the main rubber elastic body 16, the radially inner face of the axially central part in a cylindrical shape is bonded by vulcanization on the radially outer face of the central axis main unit 18 of the inner axial member 12, while the radially outer face thereof is bonded by vulcanization on the opposite inner faces of the outer segments 14a, 14b. Each rubber collar part 38 of the main rubber elastic body 16 is disposed between the face of the corresponding inner collar part 20 of the inner axial member 12 and the faces of the outer collar parts 28, 28 of the outer segments 14a, 14b, which face one another. The rubber collar part 38 is bonded by vulcanization to the inner collar part 20 and the outer collar parts 28, 28. The main rubber elastic body 16 of the present embodiment takes the form of an integrally vulcanization molded component incorporating the inner axial member 12 and the outer segments 14a, 14b.

As FIGS. 4 and 6 show, a pocket part 40 is formed in the main rubber elastic body 16. The pocket part 40 has a concave shape opening in the outer peripheral face of the main rubber elastic body 16 and it is formed at the axially central part of the main rubber elastic body 16. In the vicinity of the opening of the pocket part 40, the radially outer face of the main rubber elastic body 16 is bonded to the outer segment 14a. Meanwhile, the window 30 of the outer segment 14a is positioned relative to the opening of the pocket part 40, so that the pocket part 40 is opened onto the radial outside via the window 30. The pocket part 40 is formed in the radially outer face of the main rubber elastic body 16 partially in the circumferential direction and in the axial direction, while the window 30 is formed partially in the circumferential direction and the axial direction of the outer segment 14a. Consequently, the main rubber elastic body 16 is bonded by vulcanization also to the bonded parts 32 of the outer segment 14a, whereby the inner axial member 12 and the bonded parts 32 are elastically connected by the main rubber elastic body 16, continuously in the radial direction.

The stopper 26, which is supported by the inner axial member 12, projects in the pocket part 40 and is disposed at the central part thereof such that at least the tip part is separated from the wall inner faces of the pocket part 40 in the axial direction and in the circumferential direction. In this embodiment, the projecting tip part to the radial outside of the stopper 26 is exposed from the main rubber elastic body 16. Alternatively, the projecting tip face of the stopper 26 may be covered by a buffering rubber formed integrally with the main rubber elastic body 16, a buffering rubber separated from the main rubber elastic body 16, an independent buffering foam body, or the like.

In the main rubber elastic body 16, a positioning concavity 42 is formed. The positioning concavity 42 is a small-diameter circular concave part, which opens to the radially outer face of the main rubber elastic body 16, on the opposite side to the pocket part 40 in the diametrical direction. The positioning concavity 42 is positioned relative to the positioning hole 34 of the outer segment 14b, so that it opens to the radial outside via the positioning hole 34. In the vicinity of the opening of the positioning concavity 42, the radially outer face of the main rubber elastic body 16 is bonded by vulcanization to the outer segment 14b.

As FIGS. 4 and 7 show, the main rubber elastic body 16 is exposed to the radial outside via the apertures 36, 36 on the circumferential outsides of the outer segment 14b, in a half circumference that is opposite in a diametrical direction to the side where the pocket part 40 is provided. In the present embodiment, the outer segment 14a is also formed with a circumferential length that is shorter than a half circumference. Thus, also in the half circumference where the pocket part 40 is provided, the main rubber elastic body 16 is exposed to the radial outside, on the circumferential outsides of the outer segment 14a. In short, the main rubber elastic body 16 is exposed to the outside, in each gap between the both circumferential ends of the outer segment 14a and the outer segment 14b.

Moreover, an annular groove 44 shown in FIG. 2 opens to each part of the radially outer face of the main rubber elastic body 16 that is exposed between the outer segment 14a and the outer segment 14b in the circumferential direction. The annular groove 44 is constituted by concave grooves extending in the axial direction along the circumferential end of the outer segment 14a and the circumferential end of the outer segment 14b, and concave grooves extending in the circumferential direction along the base ends of the rubber collar parts 38 of the main rubber elastic body 16. Thus, each of the annular grooves 44 extends continuously in a shape of about rectangular annulus in the exposed part of the main rubber elastic body 16 referred above. As FIGS. 4 and 5 show, a section of the main rubber elastic body 16 enclosed by each annular groove 44 is a buffering projection 46 projecting to the radial outside.

Figure 8:
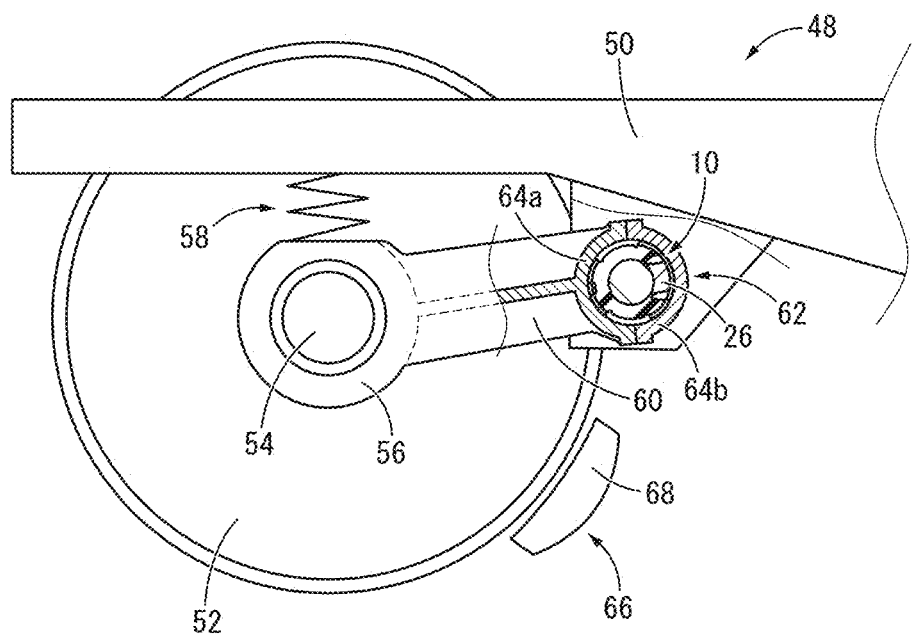
FIG. 8 is a right side view showing the rubber bushing for axle beam of FIG. 1 as mounted on a railway vehicle.

The rubber bushing for axle beam 10 of this structure is attached to a truck 48 of the railway vehicle, as FIG. 8 shows. The truck 48 comprises a truck frame 50 and a wheel 52, and has a structure wherein an axle box part 56 that supports an axle 54 of the wheel 52 is elastically linked to the truck frame 50 by a primary spring 58, while an axle beam 60 extends out from the axle box part 56 to the back side of the vehicle. A housing part 62 provided at the extending end of the axle beam 60 is connected to the truck frame 50 by the rubber bushing for axle beam 10.

More specifically, the housing part 62 of about cylindrical shape is constituted by mutually fixing semi-tubular members 64a, 64b of about semi-cylindrical shape which face each other in the longitudinal direction of the vehicle. The rubber bushing for axle beam 10 is inserted and fitted in the housing part 62 in a state where the outer segments 14a, 14b are held between the semi-tubular members 64a, 64b that face each other.

The orientation of the rubber bushing for axle beam 10 is set such that the direction in which the outer segments 14a, 14b face each other is the longitudinal direction of the vehicle. As a result, the semi-tubular members 64a, 64b are superposed to the outer segments 14a, 14b from the outsides in the direction where the outer segments 14a, 14b face each other. In the present embodiment, a not-shown positioning convex part is formed in the opposite inner face of the semi-tubular member 64a. This positioning convex part is inserted in the positioning hole 34 of the outer segment 14b, thereby constituting a positioner for positioning the rubber bushing for axle beam 10 relative to the housing part 62. In this way, since the housing part 62 has a division structure constituted by the longitudinal pair of semi-tubular members 64a, 64b, the outer segments 14a, 14b are attached to the housing part 62 by an easy work.

Besides, the outer segments 14a, 14b formed with the respective circumferential lengths that are shorter than a half circumference are disposed to face each other in the longitudinal direction. The longitudinal pair of semi-tubular members 64a, 64b are superposed from outsides of the facing direction and attached to the outer segments 14a, 14b. Therefore, damages on the outer segments 14a, 14b caused by galling due to contact of the corners of the circumferential ends of the semi-tubular members 64a, 64b with the radially outer faces of the outer segments 14a, 14b are also avoided.

For the inner axial member 12 of the rubber bushing for axle beam 10, the fixation parts 22 provided at the both axial ends thereof are fixed to the truck frame 50, using not-shown mounting bolts inserted through the bolt holes 24.

In this way, the inner axial member 12 of the rubber bushing for axle beam 10 is attached to the truck frame 50, while the outer segments 14a, 14b are attached to the axle beam 60, which is on the side of the wheel 52. By so doing, the wheel 52 is elastically linked to the truck frame 50 via the primary spring 58 and the rubber bushing for axle beam 10. When the wheel 52 undergoes displacement in the vertical direction while being accompanied by deformation of the primary spring 58, swinging of the axle beam 60 around the inner axial member 12 is allowed by elastic deformation of the main rubber elastic body 16, thereby absorbing vibration and impulse.

Although compressive and tensile loads in the vehicle longitudinal direction are also input in the rubber bushing for axle beam 10, the pair of outer segments 14a, 14b face each other in the vehicle longitudinal direction, so that, in relation to an input in the vehicle longitudinal direction, compression spring and tensile spring of the main rubber elastic body 16 dominate. As a result, the durability of the main rubber elastic body 16 is improved, while comparatively hard spring characteristics owing to the compression spring and the tensile spring are obtained. Thus, by forming the window 30 and the apertures 36 in the outer segments 14a, 14b, it is possible to tune the spring characteristics with a great degree of freedom. During the drive of the railway vehicle, the state where the stopper 26 is spaced apart from the housing part 62 inward in the radial direction of the housing part 62 is kept such that a linear spring characteristics owing to the elastic deformation of the main rubber elastic body 16 are gotten.

For the truck frame 50, a brake apparatus 66 is provided. A brake shoe 68 is pressed against the radially outer face of the wheel 52 from either longitudinal side by hydraulic pressure etc., thereby braking rotation of the wheel 52. Thus, in the truck 48 of the present embodiment, the brake apparatus 66 is a single-push type wheel tread brake.

For example, contact of the brake shoe 68 to the wheel 52 from the vehicle front side exerts a force acting backward on the axle beam 60. As a result, the axle beam 60 undergoes displacement to the back side, so that the inner axial member 12 is relatively displaced in the direction where the outer segments 14a, 14b face each other. Here in the rubber bushing for axle beam 10, relative displacement between the inner axial member 12 and the outer segments 14a, 14b is limited by contact between the stopper 26 and the housing part 62 (the semi-tubular member 64b).

Specifically, the stopper 26 is disposed to protrude from the inner axial member 12 toward the semi-tubular member 64b while facing the semi-tubular member 64b in the longitudinal direction via the window 30. When the semi-tubular member 64b is greatly displaced relative to the inner axial member 12 during vehicle braking, the inner axial member 12 and the semi-tubular member 64b are abutted against each other via the stopper 26. This abutting limits relative displacement in the longitudinal radial direction between the inner axial member 12 and the housing part 62, and hence the outer segments 14a, 14b. Since this displacement limitation mechanism is provided so as to limit the elastic deformation amount of the main rubber elastic body 16, thereby avoiding damage due to excessive deformation of the main rubber elastic body 16.

In this embodiment, the rubber bushing for axle beam 10 is positioned relative to the housing part 62 using the positioner, whereby the projection direction of the stopper 26 is set to the vehicle longitudinal direction precisely. By so doing, it is possible to stably get displacement limitation action owing to the stopper 26, thereby realizing the target characteristics and the durability.

In order to constitute the above-described displacement limitation mechanism, the pocket part 40 for housing the stopper 26 is formed in the main rubber elastic body 16, resulting in reduction of the rubber volume of a part of the main rubber elastic body 16 which connects the inner axial member 12 and the outer segment 14a with each other. Here, the apertures 36 are formed at the both circumferential ends of the outer segment 14b, thereby reducing the rubber volume of a part of the main rubber elastic body 16 which connects the inner axial member 12 and the outer segment 14b. Formation of these apertures 36 adjusts the spring exerted by the rubber between the inner axial member 12 and the outer segment 14b in the radial direction. This makes it possible to obtain the target spring characteristics for the both front and back sides of the vehicle.

Especially, the spring exerted by the rubber between the inner axial member 12 and the outer segment 14a in the radial direction is likely to get small due to formation of the window 30 and the pocket part 40. However, the spring exerted by the rubber between the inner axial member 12 and the outer segment 14b in the radial direction is reduced by providing the apertures 36, 36, so that it becomes easier to set the spring characteristics mutually close for the front side and the back side of the vehicle. This makes it possible to realize displacement limitation by the stopper 26 during the vehicle braking, while adjusting the spring characteristics of the rubber bushing for axle beam 10 in the vehicle longitudinal direction with a great degree of freedom in the normal driving state. Consequently, excellent elastic connection performance can be obtained.

The pocket part 40 wherein the stopper 26 is disposed and the window 30 corresponding to the opening of the pocket part 40 open partially in the axial direction and in the circumferential direction. The part around the pocket part 40 is bonded by vulcanization to the part around the window 30 of the outer segment 14a. By so doing, not only in the parts out of the window 30 and the pocket part 40 in the circumferential direction, but also in the parts out of the same in the axial direction, the main rubber elastic body 16 is disposed to provide linkage between the inner axial member 12 and the outer segment 14a in the radial direction. Therefore, the spring of the main rubber elastic body 16 is exerted comparatively largely between the inner axial member 12 and the outer segment 14a. This makes it easier to adjust the springs of the main rubber elastic body 16 in the longitudinal direction.

Since the apertures 36 are formed at the circumferential ends of the outer segment 14b, it is possible to form the apertures 36 more easily. Particularly in the present embodiment, the apertures 36 are formed across the entire axial length of the outer segment 14b including the outer collar parts 28, 28. This makes it possible to form the apertures 36 markedly easily, by shortening the circumferential length of the whole outer segment 14b.

In the present embodiment, the sum of the opening areas of the apertures 36, 36 is larger than the opening area of the window 30. Owing to this, the front spring stiffness and the back spring stiffness are set to be even closer. It is because, in this embodiment, the window 30 is formed at the roughly vertical center so as to open in the nearly vehicle longitudinal direction, while the apertures 36, 36 are formed at the circumferential ends of the outer segment 14b and provided in positions out of the vehicle longitudinal direction to the respective upper and lower sides.

As a result of vertical motion of the wheel 52 or the like, a torsional load in the circumferential direction is input upon the rubber bushing for axle beam 10. Then, the projecting tip face and the circumferential end faces of the stopper 26 are exposed from the main rubber elastic body 16, whereby compression of the main rubber elastic body 16 by the stopper 26 is unlikely to occur. Therefore, it is possible to avoid the spring in the circumferential direction from getting too hard due to compressive component. This makes it possible to advantageously attain the degree of freedom in tuning of the suspension characteristics for the truck 48, and the like.

Figure 9:
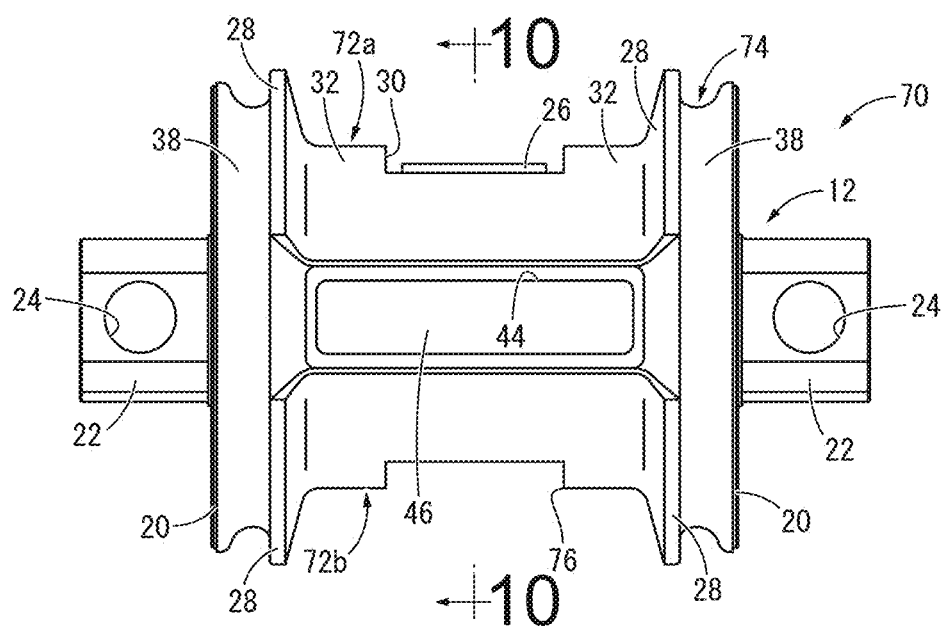
FIG. 9 is a top plan view showing a rubber bushing for axle beam as a second embodiment of the present invention.
Figure 10:
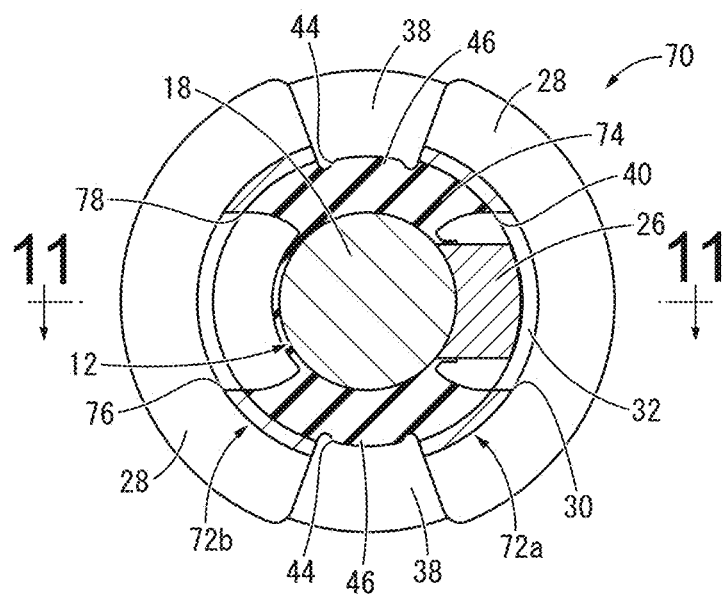
FIG. 10 is a cross sectional view taken along line 10-10 of FIG. 9.
Figure 11:
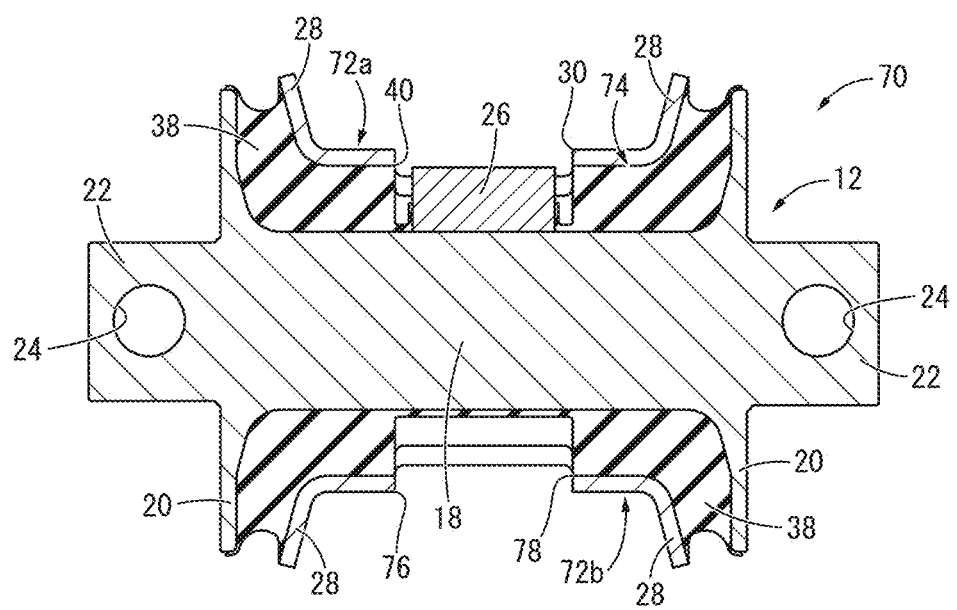
FIG. 11 is a cross sectional view taken along line 11-11 of FIG. 10.

FIGS. 9 to 11 show a rubber bushing for axle beam 70 as a second embodiment of the tubular elastic linkage device for axle beam according to the present invention. The rubber bushing for axle beam 70 comprises the inner axial member 12, outer segments 72a, 72b, and a main rubber elastic body 74 elastically connecting them with one another. With the description hereafter, for substantially the same members and parts as those of the first embodiment, the same code numbers are given in the drawings, and descriptions will be omitted.

The outer segment 72a of this embodiment is nearly equal to the outer segment 14a of the first embodiment. Besides, the outer segment 72a and the outer segment 72b have roughly the same shape as each other. Specifically, the circumferential lengths for the outer segment 72a and the outer segment 72b are about equal to each other. Additionally, in the outer segment 72b, an aperture 76 that has substantially the same opening area and opening shape as those of the window 30 of the outer segment 72a is formed at the central portion in the axial direction and in the peripheral direction thereof. Consequently, in a state the outer segment 72a and the outer segment 72b are bonded by vulcanization on the radially outer face of the main rubber elastic body 74 as mutually opposed in the diametrical direction, the window 30 and the aperture 76 are disposed on opposite longitudinal sides in the diametrical direction, i.e., they are provided at parts mutually opposed in the diametrical longitudinal direction.

In the main rubber elastic body 74, a lightening recess 78 is formed. This lightening recess 78 is a concavity opening in the outer peripheral face of the main rubber elastic body 74 with about the same opening area and opening shape as those of the pocket part 40. The lightening recess 78 is formed on an opposite side to the pocket part 40 facing the pocket part 40 in the diametrical direction. The outer segment 72b is bonded on the radially outer face of the main rubber elastic body 74, so that the lightening recess 78 opens onto the radial outside via the aperture 76 of the outer segment 72b. Consequently, the main rubber elastic body 74 includes nearly the same concave parts on both front and back sides, and is bonded on the outer segments 72a, 72b with generally the same embodiments, so that the springs in the longitudinal direction are made nearly equal to each other.

In this way, for the rubber bushing for axle beam 70, the window 30 is formed at the middle portion in the circumferential direction of the outer segment 72a, while the aperture 76 is formed at the middle portion in the circumferential direction of the outer segment 72b. Therefore, an effect on the longitudinal spring characteristics with the shape and the size of the window 30 and an effect on the longitudinal spring characteristics with the shape and the size of the aperture 76 are close, thereby facilitating adjustment of the spring characteristics for the both front and back sides. Especially, since the window 30 and the aperture 76 are opposed to each other in the diametrical direction, the respective effects exerted on the spring characteristics by the shape and the size for the window 30 and the aperture 76 are mutually closer, thereby further facilitating the adjustment of the longitudinal spring stiffness.

The window 30 and the aperture 76 are formed with substantially the same shape and size, and the outer segment 72a and the outer segment 72b are nearly equal to each other in shape. This makes it easier to set the springs on the both front and back sides with mutually close characteristics. Therefore, it is possible to get excellent characteristics with respect to a vibration input in the longitudinal direction.

The pocket part 40 opening to the radially outer face is formed in the main rubber elastic body 74, and the pocket part 40 opens onto the outside via the window 30. Meanwhile, the lightening recess 78 corresponding to the pocket part 40 is formed, and the lightening recess 78 opens onto the outside via the aperture 76. Owing to these, the springs of the main rubber elastic body 74 in the longitudinal direction are generally the same as each other more precisely. Thus, when the spring characteristics equal between the front and back sides are set, it is possible to realize the target spring characteristics with easiness at a high level.

It is also possible to tune the springs in the longitudinal direction to have mutually different characteristics, as appropriate, by differentiating the shape and the size, between the window 30 and the aperture 76, or between the pocket part 40 and the lightening recess 78.

Although the embodiments of this invention have been described above, the present invention is not limited by the specific description of the embodiments. For example, the structure of the aperture formed in the outer segment 14b should not be interpreted in a limited way by the specific description of the embodiment. That is, a plurality of apertures may be formed in the middle portion in the axial direction or in the circumferential direction of the outer segment 14b. Alternatively, an aperture may be formed only at either end in the circumferential direction of the outer segment 14b. Besides, it is also possible to form apertures at both the ends and the middle portion in the circumferential direction of the outer segment 14b.

The stopper 26 is not always required to be directly fixed to the inner axial member 12, and it can be elastically connected to the inner axial member 12 via the main rubber elastic body 16. Moreover, the stopper 26 may be formed integrally with the inner axial member 12.

The positioning hole is not indispensable and can be omitted like the second embodiment. It is possible as well to adopt other positioning structures than the hole. The formation position of the positioning hole is not especially limited, either. For example, it is also possible to form a positioning hole at a part out of the aperture 76 and the window 30 in the second embodiment.

The orientation with which the rubber bushing for axle beam 10 is mounted to the housing part 62 is just an example. Alternatively, if the side to which the brake shoe 68 is pressed is inverted in the longitudinal direction relative to that of the aforementioned embodiment, it is necessary to set the protrusion side of the stopper 26 reversed as well, so that the orientation with which the rubber bushing for axle beam 10 is mounted to the housing part 62 is inverted.

What is claimed is:

1. A tubular elastic linkage device for an axle beam for elastically linking a truck frame and an axle beam of a railway vehicle comprising:
    an inner axial member configured to be fixed to the truck frame of the railway vehicle;
    a pair of outer segments disposed about an outer periphery of the inner axial member so as to face each other in an axis-perpendicular direction, the pair of outer segments being configured to be attached to a tubular housing part provided at an end of the axle beam, each of the outer segments extending in a circumferential direction thereof by a length shorter than a half circumference, at least one circumferential end of one of the outer segments being separated from circumferential ends of the other of the outer segments; and
    a main rubber elastic body elastically connecting the inner axial member and the pair of outer segments with one another, wherein
    a pocket part is formed in one side of the main rubber elastic body so as to open in an outer peripheral face thereof, while a window is formed through a first one of the outer segments such that the pocket part opens onto an outside via the window,
    a stopper supported by the inner axial member is disposed in the pocket part so that the stopper faces the housing part with a distance in between in an axis-perpendicular direction via the window, while the stopper is configured to be abutted against the housing part so as to constitute a displacement limitation mechanism limiting relative displacement between the inner axial member and the pair of outer segments, and
    an aperture is defined by a second one of the outer segments so that an other side of the main rubber elastic body deviate from the pocket part is exposed to the outside via the aperture.

2. The tubular elastic linkage device for axle beam according to claim 1, wherein the aperture is formed at an end in a peripheral direction of the second one of the outer segments.

3. The tubular elastic linkage device for axle beam according to claim 2, wherein an opening area of the aperture is larger than an opening area of the window.

4. The tubular elastic linkage device for axle beam according to claim 1, wherein the aperture is formed at a middle portion in a peripheral direction of the second one of the outer segments.

5. The tubular elastic linkage device for axle beam according to claim 4, wherein the aperture is formed with the same opening shape and the same opening area as those of the window, while the aperture is positioned as opposed to the window in an axis-perpendicular direction.

6. The tubular elastic linkage device for axle beam according to claim 4, wherein a lightening recess is formed in the main rubber elastic body so as to open in the outer peripheral face thereof, while the lightening recess opens onto the outside via the aperture.

7. The tubular elastic linkage device for axle beam according to claim 1, wherein the pair of outer segments are configured to be attached to a pair of front and back semi-tubular members constituting the housing part by superposing the pair of front and back semi-tubular members of the housing part to the pair of outer segments from opposite outsides.

8. The tubular elastic linkage device for axle beam according to claim 1, further comprising a positioner configured to position at least one of the pair of outer segments and the housing part relative to each other in a peripheral direction.

* * * * *